Jan. 3, 1967    A. W. NELSON, JR    3,295,325
JET ENGINE AFTERBURNER FLAMEHOLDER
Filed April 29, 1965    6 Sheets-Sheet 1

INVENTOR
ARTHUR W. NELSON, JR.
BY Vernon F. Hauschild
ATTORNEY

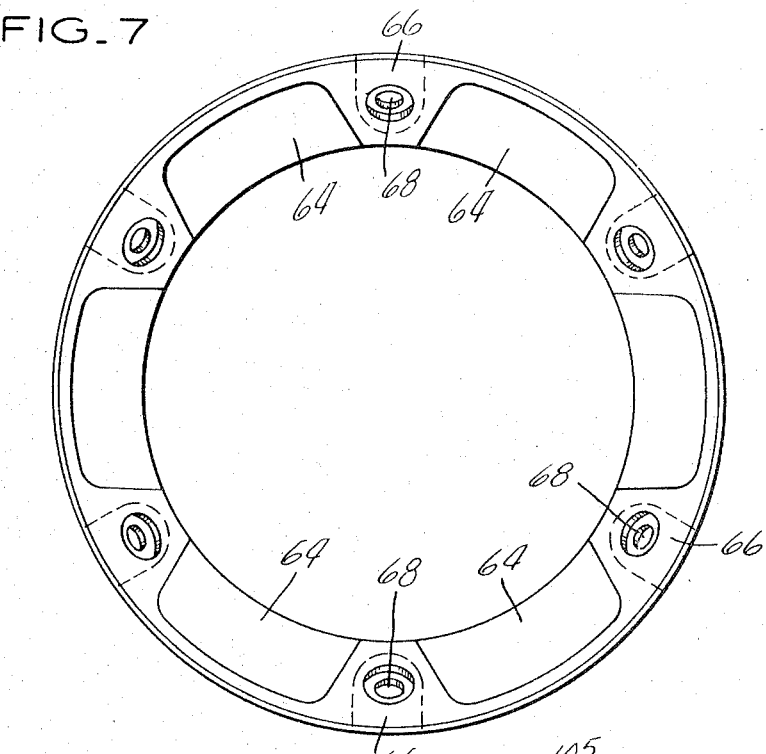
FIG_7
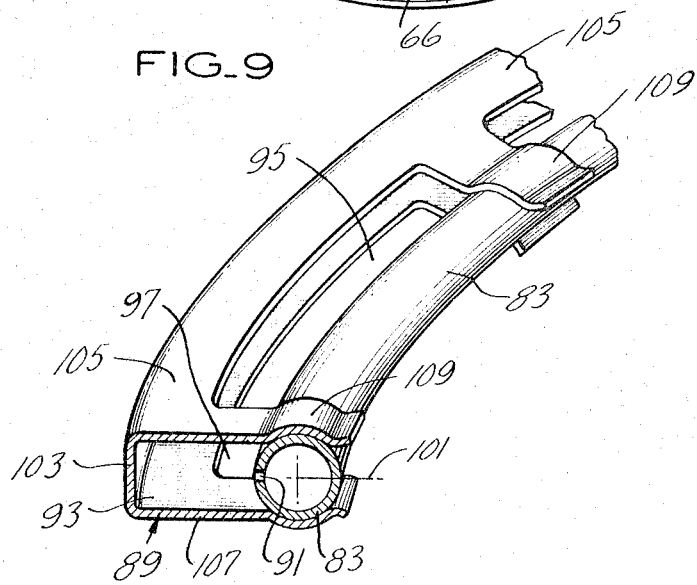
FIG_9

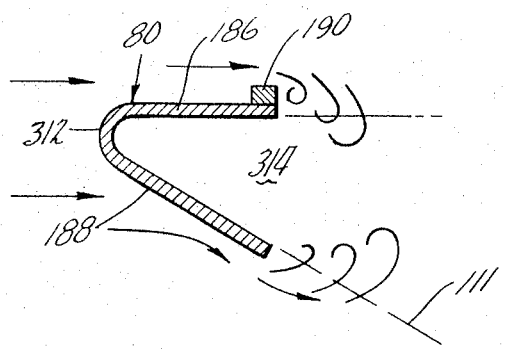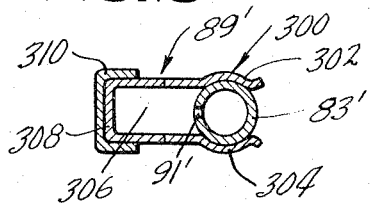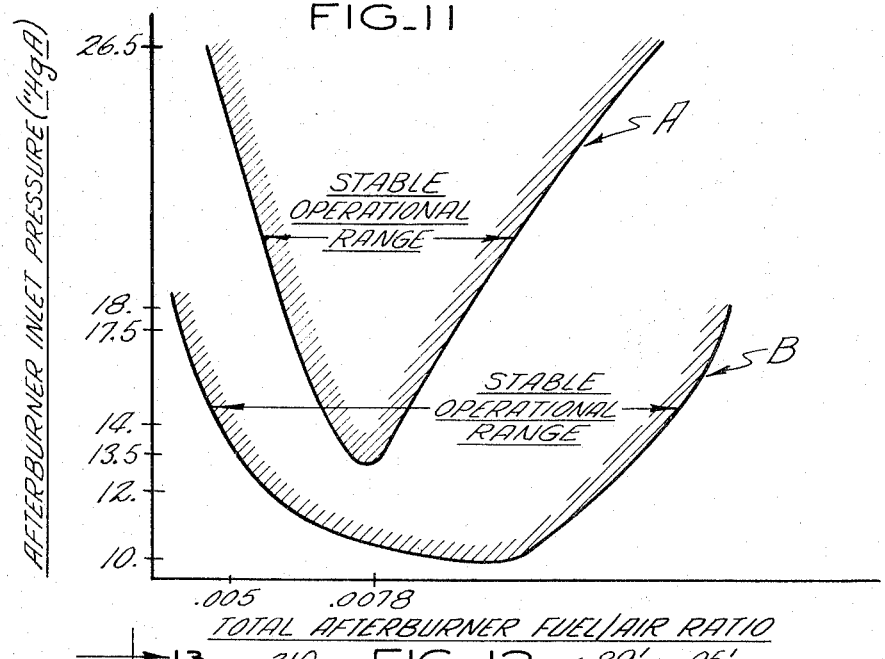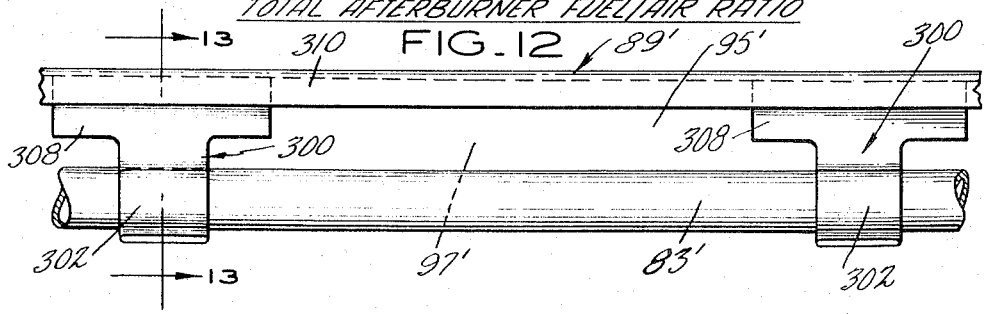

United States Patent Office 3,295,325
Patented Jan. 3, 1967

3,295,325
JET ENGINE AFTERBURNER FLAMEHOLDER
Arthur W. Nelson, Jr., Glastonbury, Conn., assignor to United Aircraft Corporation, East Hartford, Conn., a corporation of Delaware
Filed Apr. 29, 1965, Ser. No. 451,861
6 Claims. (Cl. 60—261)

This invention relates to combustion apparatus and more particularly to the supporting of combustion in the afterburner of a turbojet or turbofan engine.

It is an object of this invention to provide apparatus to establish a combustion supporting zone in an afterburner duct through which gas is being passed at a high velocity.

It is an object of this invention to teach a flameholder ring for use in an afterburner which is formed to cause the combustion supporting zone downstream thereof to be oriented in a selected direction.

It is an object of this invention to teach flameholder apparatus for use in an afterburner which is of lightweight construction, which presents minimal blockage to afterburner gas flow, and which has good operating characteristics at all aircraft altitudes.

It is an object of this invention to teach a flameholder ring for use in an afterburning turbofan engine which is fabricated to cause hot gases to flow into the cold gas stream.

It is an object of this invention to teach a flameholder ring which includes a circumferentially extending lip to trip the gas flowing thereover and cause recirculation behind or downstream of the flameholder.

It is a further object of this invention to teach a trough-shaped flameholder ring which is capable of propagating a flame front which projects laterally into a cold air stream, which flameholder ring includes a flat cylindrical face with an aerodynamic trip in the form of a radially inwardly extending flange on the downstream end thereof and which further includes a divergent face connected smoothly to the cylindrical face at the upstream end thereof and which diverges therefrom and from the afterburner axis in a downstream direction.

It is an object of this invention to teach a flamespreader positioned between flameholder rings of unequal diameter, which flamespreader increases in cross-sectional area in the direction in which the flame is to be spread and which is shaped to form a venturi.

It is an object of this invention to teach a flamespreader between flameholder rings which is of trough-shaped cross section and which is of an intermediate cross-sectional area which it connects to the flameholder from which flame is to be spread and is of maximum cross-sectional area adjacent the flameholder to which flame is to be spread, and which is of minimum cross-sectional area therebetween.

Other objects and advantages will be apparent from the specification and claims and from the accompany drawings which illustrate an embodiment of the invention.

In the drawings:

FIG. 4 is a view taken along line 4—4 of FIG. 2.

FIG. 5 is a view taken along line 5—5 of FIG. 2.

FIG. 6 is a view taken along line 6—6 of FIG. 2.

FIG. 7 is a view of the afterburner flameholder support ring.

FIG. 8 is a view taken along line 8—8 of FIG. 2.

FIG. 9 is a view taken along line 9—9 of FIG. 2.

FIG. 10 is an enlarged cross-sectional view through my flameholder ring.

FIG. 11 is a graph showing the performance of my flameholder ring as compared to a conventional, symmetric, V-gutter flameholder ring.

FIG. 12 is a showing of an alternate construction of the continuous splash plate.

FIG. 13 is a view taken along line 13—13 of FIG. 12.

Figure 1:
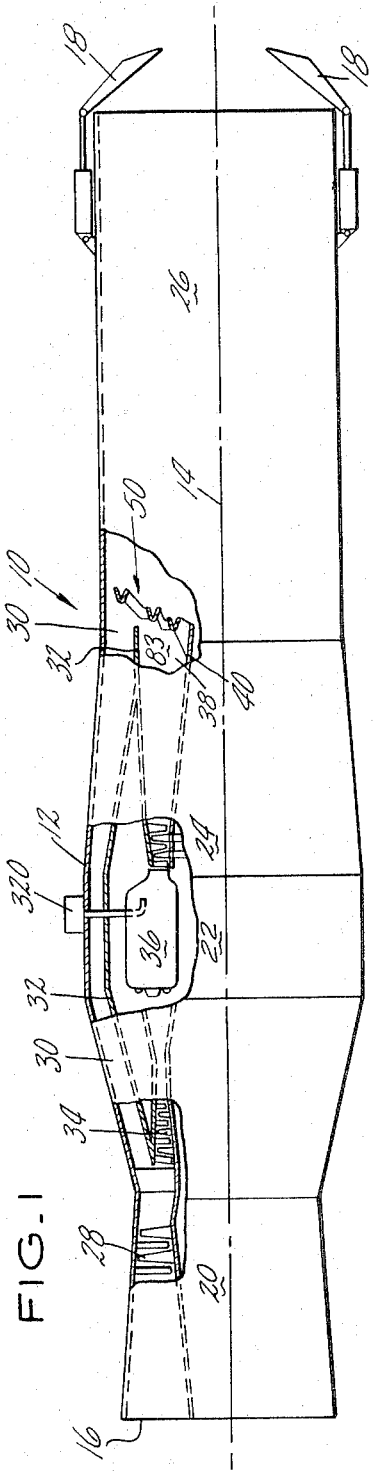
FIG. 1 is an exterior showing, partially broken away, of a turbofan engine showing the flameholder in its environment.

Referring to FIG. 1 we see engine 10, which may be of the conventional turbojet type but which is preferably of the turbofan or fan jet type. Engine 10 includes engine outer case 12 which is of circular cross section and concentric about axis 14 and which includes air inlet section 16 at its forward end and variable area exhaust nozzle 18 at its after or rearward end. The components of engine 10 include compressor section 20, burner section 22, turbine section 24 and afterburner section 26. In operation, air enters inlet section 16 and is compressed in the fan portion 28 of compressor section 20. Fan portion 28 includes a plurality of alternately positioned stationary vanes and rotating blades. After passing through fan portion 28, a portion of the compressed air then passes into annular bypass air passage 30, defined between engine case 12 and splitter duct 32, and is discharged therefrom into afterburner section 26. The remainder of the air from fan portion 28 passes through high pressure compressor section 34, which comprises a plurality of alternately positioned stationary vanes and rotating blades, for further compression therein. After leaving high pressure compressor 34, the compressed air is heated in burner section 22 due to combustion which takes place in combustion chambers 36, which may be either of the conventional can or annular type, and the heated gas is then passed through turbine section 24, where sufficient energy is extracted therefrom to drive fan portion 28 and high pressure compressor 34, and then is discharged through annular gas passage 38 formed between splitter duct 32 and afterburner central support member 40 and then into afterburner 26 for eventual discharge to atmosphere through variable area exhaust nozzle 18. Variable area exhaust nozzle 18 is of conventional design and may be of the type more fully disclosed in U.S. Patents Nos. 3,032,974, 3,057,150, 3,062,003, 2,910,829, 2,974,480 or 2,846,841, while engine 10 may be of the type shown in U.S. Patents Nos. 2,929,203, 2,978,865 and 2,979,900, to which reference may be had.

A reheat process takes place in afterburner 26 and this requires the injection of additional fuel into afterburner 26 and the establishment of a flow stabilization zone in the afterburner so that combustion may take place therein. Flameholder 50 performs the flame stabilization zone creating function.

Figure 2:
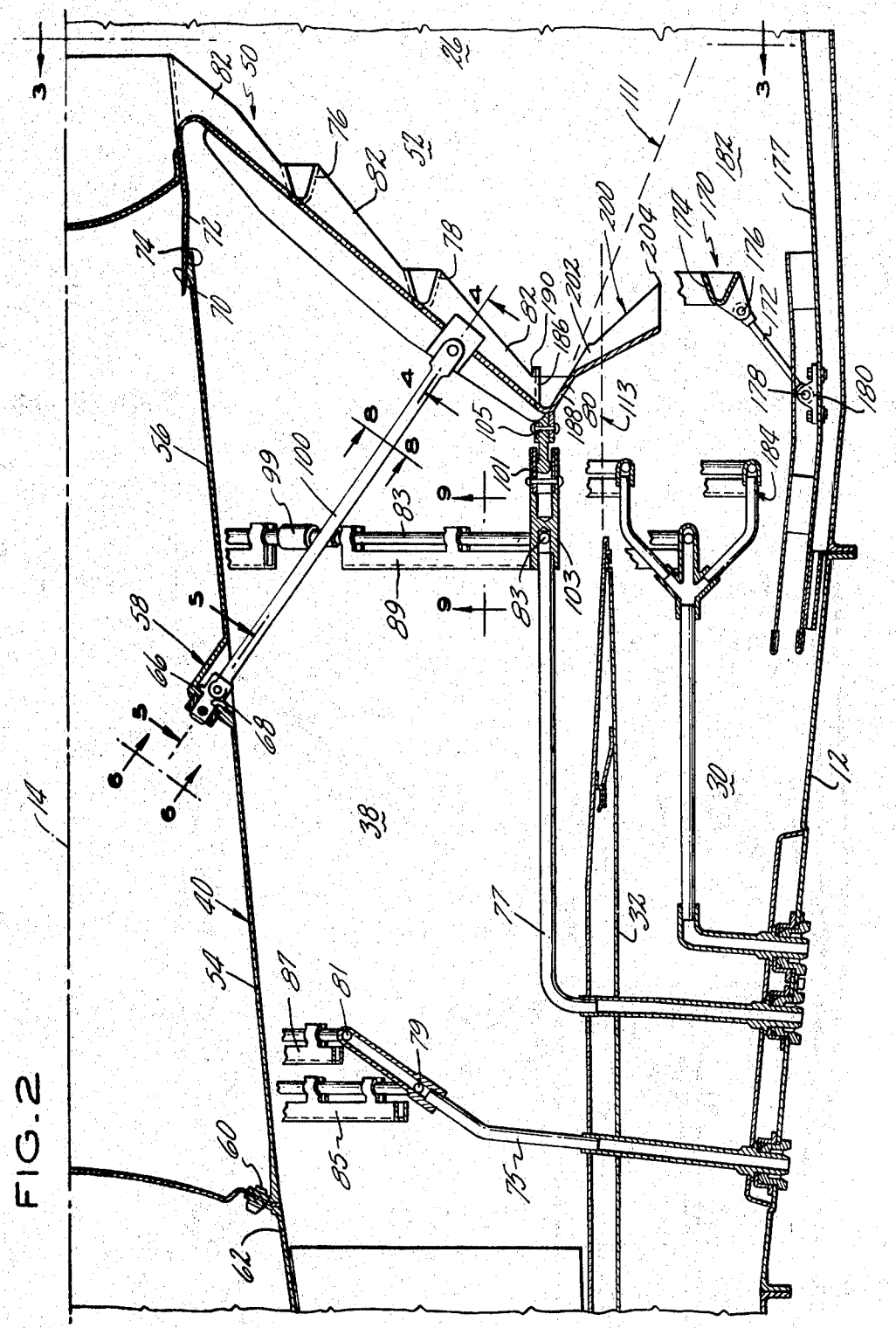
FIG. 2 is a partial cross-sectional showing through the flameholder and its support mechanism.
Figure 3:
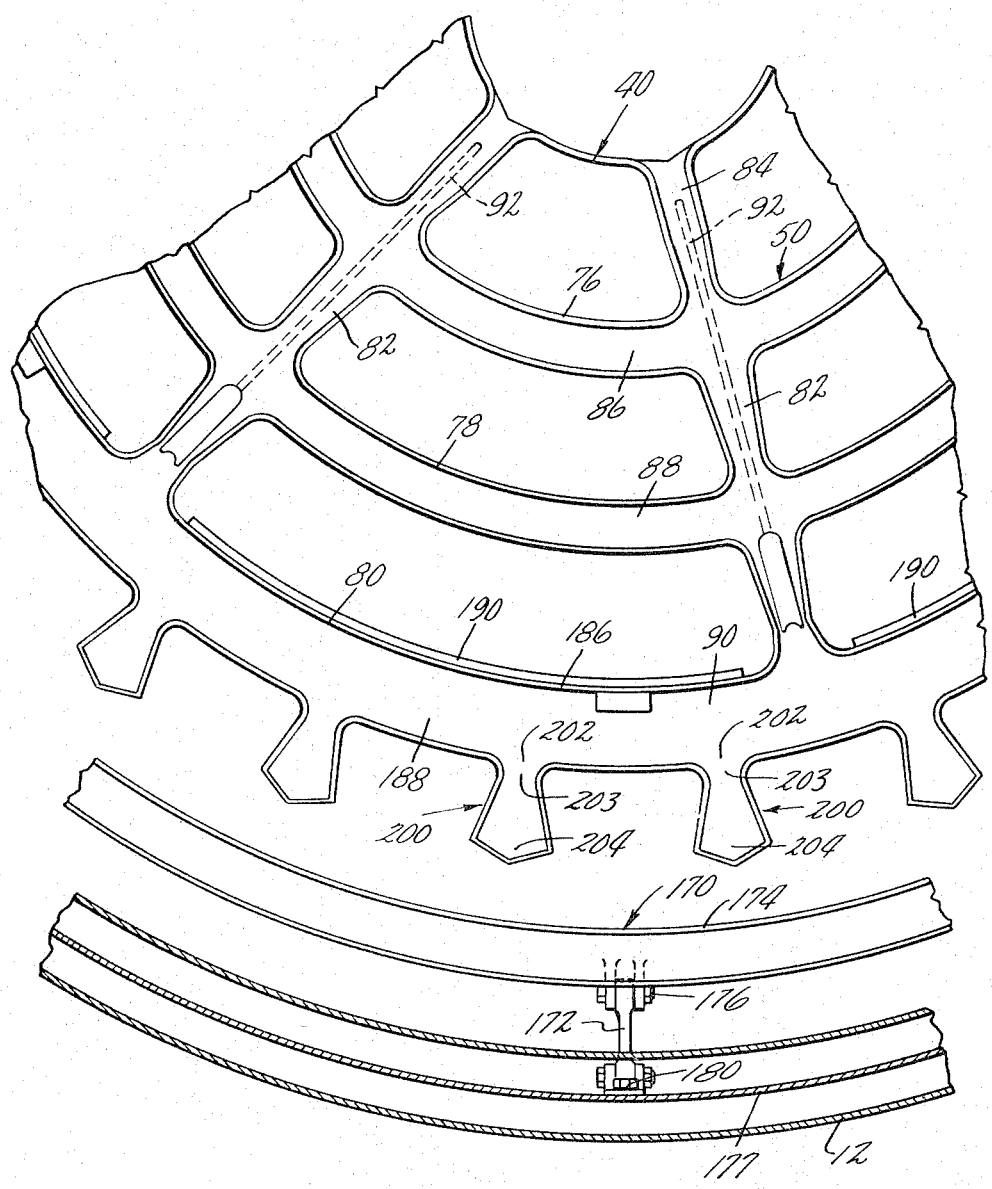
FIG. 3 is a partial rear view of the flameholder taken along line 3—3 of FIG. 2.

Referring to FIGS. 2 and 3 we see flameholder 50 and its support mechanism in greater particularity. Flameholder 50 is supported entirely from afterburner central support member or cone 40 and serves to form flow stabilization zone 52 downsteam thereof as the exhaust gases from turbine 24 are passed thereover. Central support member 40, which serves to support flameholder 50, is of circular cross section and concentric about axis 14 and includes forward conical portion 54 and after conical portion 56, which are axially separated to receive flameholder support ring 58 therebetween, which support ring is welded or in other fashion attached to forward cone portion 54 and after or rearward cone portion 56 to cooperate therewith to form a conical structure. Central support member 40 is attached by bolts 60 to turbine rear bearing support housing 62, which is in turn supported in conventional fashion by a plurality of struts (not shown) projecting between support housing 62 and engine case 12 in conventional fashion.

Support ring 58 is shown in greater particularity in FIG. 7 and includes radially extending support rib or ring 64 and a plurality of V-cross-sectioned bosses 66, which include substantially rearwardly directed apertures 68 therein.

As shown in FIG. 2, rearward portion 56 of central support member 54 terminates at its after end in inner diameter, cylindrical support surface 70.

Flameholder 50 includes sleeve member 72 which includes substantially cylindrical, outer diameter support surface 74 at the forward end thereof which engages surface 70 of support 40 in a slip fit, i.e., .005–.015 inch loose. Flameholder 50 further includes a plurality of trough or gutter-shaped, flame stabilizing rings 76, 78 and 80 which are positioned concentrically about axis 14 and which have their open ends projecting in a rearward or after direction. Rings 76–80 are spaced axially from one another such that the larger ring 80 is farthest forward or upstream and such that the smallest ring 76 is farthest rearward or downstream. Substantially radially directed connectors 82 project from central member 40, from which they project in flared and faired fashion as best shown in FIG. 3, and are connected to flame stabilizing rings 76–80 to support these rings from support member 40. Connectors 82 are positioned circumferentially about axis 14 and are also of trough-shaped cross section opening in a downstream direction, similar to rings 76–80, and are connected to rings 76–80 so that their interiors are in communication, as best shown in FIG. 3. Referring to FIG. 3 we see that the interior 84 of connector 82 is in communication with the interiors 86, 88 and 90 of rings 76, 78 and 80 so that, once combustion is established in combustion support zone 52, connectors 82 serve as flamespreaders between flame stabilization rings 76–80. Aerodynamic support web 92 extends along the forward or upstream edge of connector 82 and serves as a stiffener therefor and includes an aperture 94 therein (FIG. 4) to be utilized in a fashion to be described hereinafter.

A plurality of support rods 100 extend between flameholder 50 and central support member 40 to assist in supporting flameholder 50 from central support member 40. Support rods 100 are pivotally attached to both flameholder 50 and central support member 40 so that the flameholder and support member are free to move and grow thermally with respect to one another.

The pivot connection between support rod 100 and central support member 40 is best shown in FIG. 5 with further details shown in FIG. 6. It will be noted by observing FIG. 5 that support rod 100 is actually of two-piece construction and includes a cylindrical end 102 including aperture 104 therethrough and having boss 106 thereover, which boss has apertures 108 and 110 in the opposite walls thereof which align with aperture 104 of cylindrical end 102 to receive pin 112 which is held in place by nut 114, which may be pinned or wire-locked in position through aperture 116. Cylinder 102, it will be noted passes through aperture 68 of boss 66 of support ring 58 and includes flange 118, which abuts boss flange 120 so that the coaction of sleeve 106 and pin 112 serve to position cylinder 102 and hence connecting rod 100 with respect to boss 66 of connecting ring 58. Yoke arms 130 and 132 project from cylinder 102 and include apertures 134 and 136, which align with aperture 138 in support rod 100 to receive pin 140, which is held in position by nut 142 so that support rod 100 is accordingly pivotally connected to support ring 58 and hence central support member 40.

As best shown in FIG. 4, the opposite end of support rod 100 is pivotally attached to flameholder 50. At its opposite end, support rod 100 includes yoke arms 150 and 152 which have aligned apertures 154 and 156 therein, which apertures align with aperture 94 of flameholder support web 92 to receive pivot pin 160 therethrough and pivot pin 160 is held in position by nut 162.

It will accordingly be seen by viewing FIGS. 4 and 5 that connecting rods 100 are pivotally attached to the central support member 40 and flameholder 50. Accordingly, rings 76–80 may thermally expand with respect to central support member 40.

To permit reheating in afterburner 26, it is necessary to inject fuel into the afterburner to be mixed therein with the engine exhaust gases and to burn as a stochiometric fuel-air mixture within the combustion stabilization zone 52 downstream of flameholder 50. Fuel is injected through tubes 75 and 77, shown in FIG. 2 and passes therefrom into hollow, apertured fuel dispensing rings 79, 81 and 83 and through apertures in the walls of these fuel dispensing rings into splash plates 85, 87 and 89. Fuel rings 81, 79 and 83 are concentric about axis 14 and are of substantially the same diameter as flameholder rings 76, 78 and 80, respectively.

For optimum efficiency and performance, it is important that the fuel which is injected into afterburner 26 by the fuel rings, such as 83, be controlled in radial dispersion and circumferential dispersion so that a symmetrical and continuous fuel-air pattern is passed axially across each flameholder ring such as 80. It is essential that the radial dispersion of the fuel from the fuel rings such as 83 be controlled so that fuel does not pass by flameholder rings 76–80 and through afterburner 26 unburned. It is also highly desirable that the splash plate, such as 89, serve to circumferentially disperse the fuel injected thereinto from the fuel ring 83 such that a circumferentially continuous pattern of fuel is passed axially over the flameholder ring 80.

Figure 14:
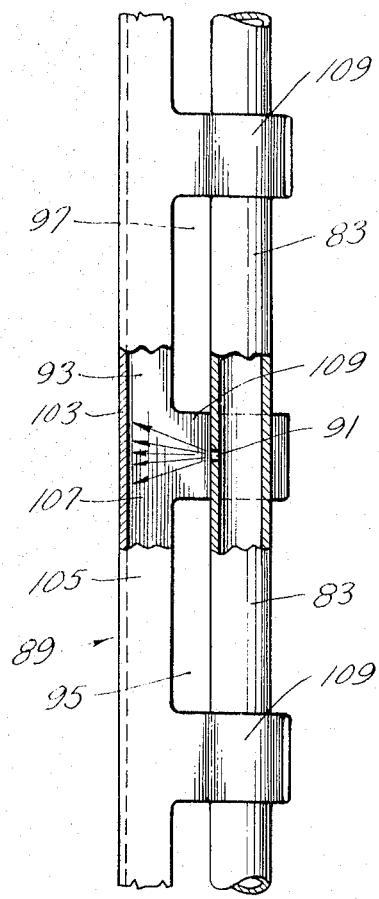
FIG. 14 is a plan view, partly broken away, of the continuous splash plate construction.
Figure 15:
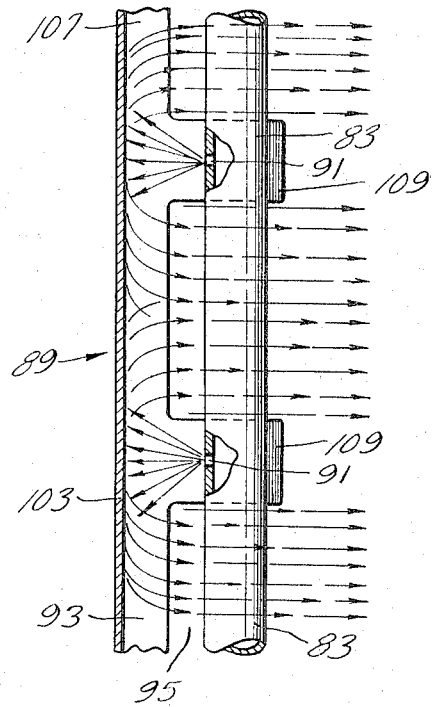
FIG. 15 is a broken away showing of the continuous splash plate to illustrate fuel dispersion pattern.

The construction of the fuel dispensing rings and the continuous splash plates will be considered as shown in FIGS. 9, 14 and 15 to describe fuel dispersing ring 83 and continuous splash plate 89.

As shown in FIGS. 9 and 14, the fuel in the fuel tube 83 passes substantially forwardly or upstream therefrom through circumferentially spaced apertures 91 into the hollow interior 93 of circumferential, U-shaped splash plate 89 from whence the fuel is distributed uniformly in a circumferential direction and controlled to flow in a radial direction through circumferential apertures 95 and 97 formed top and bottom between splash plate 89 and fuel tube 83. It will be noted that splash plate 89 is continuous and extends circumferentially to cover several apertures and is broken only where required at places such as fuel tube joint 99 (FIG. 2). The axes 101 of apertures 90 are substantially parallel to afterburner case axis 14. Continuous splash plate 89 includes radial plate 103 spaced from and in axial alignment with apertures 91 and also includes axial, ring-segmented plates 105 and 107, which cooperate to form channel shaped or U-shaped continuous splash plate 89. Clip support members 109 attach to fuel dispensing tube 83 and to splash plate 89 so as to position flameholder 89 in spaced relation axially forward of fuel ring 83 to establish top and bottom circumferential apertures 95 and 97 therebetween. Clip members 109 and splash plate 89 are preferably of integral construction and clip members 109 may be brazed or welded to tube 83.

We have found that for fuel rings of 30 to 40″ diameter, fuel dispensing apertures 91 should be spaced about 2½ inches apart and should be about .025 inch in diameter. The splash plate 89 should be spaced about ¼ of an inch forward of ring 83. As best shown in FIG. 15, the fuel sprayed from apertures 91 sprays forwardly to stroke splash plate 89 and ricochet a flow rearwardly and circumferentially therefrom into the high velocity gas stream through afterburner 26 and is carried axially therewith in a uniform circumferential pattern.

Continuous splash plate 89 serves the additional function of raising the natural frequency of tube 83 and thereby improving its vibration withstanding qualities. The fuel injected through rings 79, 81 and 83 is preferably a liquid, such as kerosene or other similar liquid hydrocarbon compounds.

Test results and motion pictures show that such a splash plate construction provides fuel of uniform circumferential distribution and of controlled radial distribution to an afterburner flame stabilization ring, such as 80, downstream thereof. The fuel so injected will be burned in flow stabilization zone 52 downstream of the flameholder 50.

An alternate embodiment of the continuous splash plate is shown in FIGS. 12 and 13. Referring to these two figures we see hollow fuel dispensing tube 83' which has forwardly oriented and circumferentially spaced fuel dispersing apertures 91' therein. Continuous splash plate 89' comprises support clip members such as 300 which include radially outer clip legs such as 302 and radially inner clip legs such as 304 attached by either a clipping or pinching action or by brazing to tube 83' in radial alignment with each aperture 91' and defining an axially forwardly directed passage 306 forward of each aperture 91'. Clip legs 302 and 304 attach to U-shaped bracket 308, which is of U-shaped cross-section opening toward tube 83' and axially spaced therefrom and in axial alignment with apertures 91' and extending circumferentially thereof. Continuous channel member 310 attaches to U-shaped clips 300 and bridges the circumferential gap therebetween to cooperate therewith in defining a continuous, circumferential channel aligned with and bridging the circumferential gap between fuel dispensing apertures 91'. U-channel member 310 is arcuate in shape to follow the circumferential curvature of tube 83' and is of U-shaped cross-section opening toward tube 83.

Flameholder 50 has a plurality of circumferentially spaced ball ended pins 101 extending forwardly therefrom and received into sleeved bosses 103, which projects rearwardly from fuel ring 83. Support pin 105 pivotally connects pin 101 to flameholder 50 so that pin 101 and sleeve 103 serve to keep flameholder ring 80 and fuel spray tube 83 in axial alignment, while permitting relative motion therebetween.

While flameholder 50 serves to establish combustion stabilization zone 52 downstream thereof to permit the reheating of the exhaust gases being discharged through annular passage 38, combustion or reheating must also take place in afterburner 26 downstream of the bypass annular passage 30 defined between engine or afterburner case or duct 12 and splitter duct 32. Flameholder 170 (see FIG. 2), which is of trough-shaped cross section and in the form of a ring concentric about axis 14 is positioned downstream of annular bypass gas passage 30 by a plurality of support rods 172, which are pivotally attached to flameholder ring 174 at pivot points 176 and which are also attached to engine or afterburner duct 12 or afterburner liner 177 at pivot points 178 through boss arrangement 180. Bypass air flameholder ring 170 has cold air from passage 30 passed thereover and serves to form flow stabilization zone 182 downstream thereof in which the fuel which is injected through fuel injection means 184 may be ignited and burned. It is a very difficult problem to ignite and sustain combustion in a cold gas stream such as the one in which flameholder 170 is located and it is accordingly an important teaching of this invention that flameholder 50 be made as best shown in FIGS. 2 and 10 so that it consists of inner wall 186, which is substantially cylindrical and concentric about axis 14, and outer wall 188 which diverges in a downstream direction with respect to axis 14 such that it projects toward cold air flameholder 170 to define an included angle of about 30° with inner wall 186 and is smoothly joined to inner wall at leading edge 312. Further, a circumferentially extending aerodynamic trip in the form of circumferentially extending and inwardly projecting lip or flange 190 (FIGS. 2, 3 and 10) is attached to the after or downstream end of cylindrical wall 186 of flameholder ring 80 and serves to cause the air flowing therearound to recirculate, as shown in FIG. 10, toward the interior 314 of flameholder ring 80. Similar recirculation is caused by the air flowing over outer wall 188 as shown in FIG. 10. The specific shape of ring 80 shown in FIG. 10 establishes a hot gas-cold gas interface or flamefront to project along line 111 and out into the cold air stream downstream of passage 30 and into combustion zone 182 formed downstream of flameholder 170. This flamefront or interface 111 intercepts cold air-hot gas interface 113 defined by splitter duct 132 so as to force hot air or flame into combustion zone 182.

By referring to FIG. 11 we can see the improvement in performance obtained by the use of flameholder ring shaped as shown in FIG. 10 as opposed to a conventional and symmetrical trough-shaped ring of the type illustrated for flameholder rings 76 and 78. Curve A represents the performance curve for the conventional ring such as (76) or (78) when used in the flameholder 80 position, whereas curve B represents the performance curve for flameholder 80 of the type shown in FIG. 10. It will be noted that for any given afterburner inlet pressure level (i.e. altitude), the stable operational range from lean to rich fuel-air ratios is vastly greater for the flameholder ring shaped as shown in FIG. 10 (curve B) as compared for the conventional ring (curve A). It should also be noted that the capability for operation to higher altitudes, as represented by reduction in afterburner inlet pressure, is significantly improved for the flameholder ring shown in FIG. 10 (curve B) as compared to the conventional ring (curve A).

It is also an important teaching of this invention that a plurality of circumferentially positioned and trough-shaped flamespreaders 200 (FIGS. 2 and 3) project outwardly from flame stabilizing ring 80 and project downstream therefrom toward flameholder ring 170 in such a fashion that they increase in cross-sectional area in a downstream and radial outward direction to form a venturi as shown in FIG. 3. To be more specific, the inner end 202 of each flamespreader 200 is of intermediate cross-sectional area and tapers down to throat 203, which is of minimum cross-sectional area, then increases in cross-sectional area so that outer end 204 thereof is of maximum cross-sectional area. It will be noted that the after or outer end 204 of flamespreader 200 is substantially in radial alignment with cold stream flameholder 170 and serves to carry flame from flame stabilization ring 80 to flame stabilization ring 174 of flameholder 170, both to provide ignition of flameholder 170 in the case of a zoned afterburner and to provide added assistance for proper combustion of flameholder 170 located in the cold bypass airstream by providing added heat in the recirculation zone of this flameholder. By providing a large cross-sectional area in flamespreader 200 at its outer end 204 we are establishing a low pressure region at 204 with respect to the pressure at the inlet end 202 of the flameholder. This pressure differential causes a heat or flame pumping action from flameholder ring 80 to flameholder ring 170 in the cold air stream.

In afterburner operation, fuel is injected through fuel line 77 (FIG. 2) into flameholder ring 83 and passes therefrom against continuous splash plate 89 and is then carried by the engine exhaust gases in passage 38 symmetrically around flame stabilizing ring 80 to be ignited downstream thereof and in the interior thereof by a conventional hotstreak igniter shown as element 320 in FIG. 1 and of the type taught and fully described in U.S. Patent No. 2,913,875 to which reference is hereby made. Fuel from fuel rings 79, 81 and 184 is then caused to pass around flameholder rings 78, 76 and 170, respectively.

The flame established in the interior of flame stabilization ring 80 will flow through the interior of flamespreader connectors 82 and 200 to establish combustion in and downstream of flame support rings 76 and 78 and in and downstream of cold path flameholder 170.

It is to be understood that the invention is not limited to the specific embodiment herein illustrated and described but may be used in other ways without departure from its spirit as defined by the following claims.

I claim:

1. Combustion apparatus including an afterburner case concentric about an axis and having an upstream and a downstream end, a first trough-shaped flameholder ring located in said case and concentric about said axis, a second trough-shaped flameholder ring located in said case and being of different diameter than said first ring, and at least one trough-shaped flame-spreader joined to said first ring and extending toward said second ring and shaped to define a throat between said first and second rings by being of intermediate cross-sectional area adjacent said first ring, of maximum cross-sectional area adjacent said second ring and of minimum cross-sectional area therebetween to form a venturi between said first and second rings.

2. Apparatus according to claim 1 and wherein said second flameholder ring is larger than said first flameholder ring and spaced downstream thereof.

3. Apparatus according to claim 1 and including a splitter duct positioned concentrically within said case to define a first gas passage therewithin and a second gas passage between said case and said splitter duct, said splitter duct being of a diameter intermediate the diameter of said first and second flameholder rings, means to pass hot gas through said first gas passage, means to pass cold gas through said second gas passage, means to pass atomized fuel over said first and second flameholder rings, means to ignite the atomized fuel adjacent said first ring so that flame will be spread through said flamespreader to ignite and help sustain combustion of the fuel adjacent said second flameholder ring.

4. In a turbofan engine afterburner, an afterburner case having an upstream end and a downstream end and concentric about an axis, a splitter duct positioned within said afterburner case and concentric about said axis to define a first gas passage therewithin and cooperating with said afterburner case to define a second gas passage, a flameholder ring concentric about said axis and located within said afterburner case downstream of said splitter duct and of a diameter to be located downstream of said first gas passage and having a first side which comprises a flat, cylindrical ring concentric about said axis and having a second side which diverges away from said axis in a downstream direction and toward said second passage and which smoothly joins said first side at their upstream ends to form a trough-shaped channel therewith, a second flameholder ring positioned concentrically within said case downstream of said first flameholder ring and of a diameter to be located downstream of said second gas passage, and at least one trough-shaped flamespreader connected to said first flameholder ring and extending between said first and second flameholder rings and shaped to include a minimum area throat between said first and second rings to define a venturi therebetween.

5. Apparatus according to claim 4 and including means to pass cold gas through said second gas passage, means to pass hot gas through said first gas passage and across said first flameholder ring to define a hot gas-cold gas interface projecting from said first flameholder ring second side and diverging away from said axis in a downstream direction into said cold gas, means to pass atomized fuel over said first and second flameholder rings, means to ignite the atomized fuel adjacent said first ring so that flame will spread through said flamespreader to ignite and help sustain combustion of the fuel adjacent said second flameholder ring.

6. Apparatus according to claim 5 and including an aerodynamic trip in the form of a circumferential flange projecting toward said axis from the downstream edge of said first flameholder ring first side.

References Cited by the Examiner

UNITED STATES PATENTS

| | | |
|---|---|---|
| 2,710,067 | 6/1955 | Pesaro. |
| 2,979,900 | 4/1961 | Hopper. |
| 2,988,878 | 6/1961 | Hopper. |
| 2,993,338 | 7/1961 | Wilsted _____ 60—39.72 X |
| 3,043,101 | 7/1962 | Lefebvre. |

MARK NEWMAN, *Primary Examiner.*

RALPH D. BLAKESLEE, *Examiner.*